United States Patent [19]

Aucsmith

[11] Patent Number: 5,701,464
[45] Date of Patent: Dec. 23, 1997

[54] PARAMETERIZED BLOOM FILTERS

[75] Inventor: David W. Aucsmith, Portland, Oreg.

[73] Assignee: Intel Corporation, Santa Clara, Calif.

[21] Appl. No.: 528,912

[22] Filed: Sep. 15, 1995

[51] Int. Cl.⁶ ............................................. G06F 17/30
[52] U.S. Cl. ................................. 395/610; 395/602
[58] Field of Search ............................ 395/601, 602, 395/603, 606, 610

[56] References Cited

U.S. PATENT DOCUMENTS 5,394,471  2/1995  Ganesan et al. ............... 380/23

OTHER PUBLICATIONS

Mullin, J.K. "Optimal Semijoins for Distributed Database Systems" IEEE Trans. on Software Engineering, vol. 16, No. 5, pp. 558–560, May 1990.

Gauthier, P., "Wide Area Information Retrieval" Masters Thesis, http:/http.cs.berkeley.edu/~gauthier/thesis/thesis.html, pp. 1–21, Oct. 1994.

Knuth, Donald E. *The Art of Computer Programming*, vol. 3: *Sorting and Searching*, Addison–Wesley Publishing Company, Inc. 1973, 561–562.

Bloom, Burton H., *Space/Time Trade–offs in Hash Coding with Allowable Errors*, Communications of the ACM 13, 7 (Jul. 1970), 422–426.

*Primary Examiner*—Thomas G. Black
*Assistant Examiner*—Jack M. Choules
*Attorney, Agent, or Firm*—Blakely, Sokoloff, Taylor & Zafman

[57] ABSTRACT

A method and apparatus for determining validity of a key. A bloom filter is updated in a first computer system (e.g. a client system) at periodic intervals by providing the system's requirements of the bloom filter to a second computer system (e.g. a server system). These requirements may include: a number of bits which are included in the bloom vectors; a number of the coefficients for hash functions of the bloom filter; or an error value indicating the possibility of error of the bloom filter. The second computer system has access to an invalidity database which includes all invalid keys and can generate a matrix of bloom vectors and coefficients for different client requirements. Responsive to the provision of the first system's requirements, it receives bloom vectors and coefficients which comprise the bloom filter. The system can then accept a key and apply the bloom filter to the key to determine if the key is present in the invalidity database. Invalidity of the key can be confirmed if the bloom filter indicates that the key is present in the invalidity database by transmitting the key to the second computer system to determine the presence of the key in the invalidity database. In this way, communications bandwidth is conserved because no communication between the first computer system and the second computer system need take place if the bloom filter indicates that the key is not present in the invalidity database.

26 Claims, 14 Drawing Sheets

PARAMETERIZED BLOOM FILTERS

BACKGROUND OF THE INVENTION

1. Field of the Invention

The present invention relates to a method for determining membership in a database. More specifically, the present invention relates to the use of parameterized bloom filters in order to determine membership in database, such as a key invalidity database, to determine key validity.

2. Background Information

The use of credit cards, debit cards, or other types of non-cash payment methods for a transaction requires a determination of the validity of the payment means prior to the completion of the transaction. Current methods of determining validity of such payment methods includes a client/server system such as 100 shown in FIG. 1. In one prior art method, a payment method, such as a credit card 112, is used for inputting a key 114 into a client 110. Because the list of revoked credit card numbers or "keys" 114 is very large, the client 110 performs a query 116 of key validity, for example, to a server 120. Server 120 has access to a very large invalidity database 121 which contains a list of all of the invalid keys. Thus, client 110 makes a query 116 to server 120 whether the key 114 is in the database 121. The database could contain all keys, valid and invalid, and mark which keys are invalid. For simplicity, it is assumed that only invalid keys will be found when the database is querred.

Responsive thereto, server 120 performs a lookup in an invalidity database 121 to determine the presence of the key. If the key is present in the database, then it is invalid. Server 120 then either provides a valid or invalid signal to client 110 indicating whether the key is a member of the invalidity database 121 or not. If a valid signal is returned (indicating the key is not in invalidity database 121) client 110 completes the transaction.

One shortcoming of some prior art database membership applications, such as those used in the credit card verification application discussed above, is that membership in the database is determined based upon of a request from a client and a corresponding response from a server. That is, for every transaction, a communication link must be established and a database lookup must be performed. Because keys, such as credit cards, have large numbers of possible values, and correspondingly large numbers of possible invalid keys, the server 120 is capable of communicating with large numbers of clients and can service large numbers of requests.

In order to respond to all the possible requests which may occur, especially at high traffic intervals, server 120 requires a large number of communication channels, and typically should be able to service a large number of search requests in invalidity database 121 efficiently. This requires a high performance server, which may increase costs dramatically, according to the implementation.

Thus, the prior art has suffered from the shortcoming that very expensive mechanisms for verifying the validity of keys, and correspondingly large amount of communication bandwidth must be provided in order for such a key validity determination system to be fully practicable. Such a capacity stretches resources both in terms of communication resources, computational resources, and the corresponding cost of providing such resources.

Thus, a need exists for a method and apparatus which can determine membership in a database, such as an invalidity database, but yet, minimizes computational, communication, and cost resources.

SUMMARY OF THE INVENTION

A method and apparatus for determining validity of a key. A bloom filter is updated in a first computer system (e.g. a client system) at periodic intervals by providing the system's requirements of the bloom filter to a second computer system (e.g. a server system). These requirements may include: a number of bits which are included in the bloom vectors; a number of the coefficients for hash functions of the bloom filter; or an error value indicating the possibility of error of the bloom filter. The second computer system has access to an invalidity database which includes all invalid keys and can generate a matrix of bloom vectors and coefficients for different client requirements. Responsive to the provision of the first system's requirements, it receives bloom vectors and coefficients which comprise the bloom filter. The system can then accept a key and apply the bloom filter to the key to determine if the key is present in the invalidity database.

In implemented embodiments, invalidity of the key can be confirmed if the bloom filter indicates that the key is present in the invalidity database by transmitting the key to the second computer system to determine the presence of the key in the invalidity database. The first system can receive a result signal from the second computer system indicating whether the key is present in the invalidity database. In this way, communication bandwidth is conserved because no communication between the first computer system and the second computer system need take place if the bloom filter indicates that the key is not present in the invalidity database. Applying the bloom filter includes hashing the key with the coefficients and a prime key value, also received from the second computer system when the bloom filter is updated, to generate a test value and comparing the test value with the bloom vectors to see if the bit pattern is the same.

BRIEF DESCRIPTION OF THE DRAWINGS

The present invention is illustrated by way of example and not limitation in the figures of the accompanying in which like references indicate like elements and in which.

DETAILED DESCRIPTION

Embodiments of the present invention include an invalidity detection system wherein a client maintains a local invalidity cache of a database stored in a remote system, such as a server. The client connects with the server only if a key is potentially a member of an invalidity database, as indicated by the local invalidity cache. The local invalidity cache of the invalidity database, is a hash function of all invalid keys. If the key does not exist in the local invalidity cache, then it is guaranteed that it does not appear in the invalidity database. In the instance where the key may be invalid, that is, it may be a member of the invalidity database, then the client can request that the server perform a lookup in an invalidity database. Although the present invention will be described specifically with reference to certain specific embodiments, especially those shown in FIGS. 2–12c, these embodiments are described for the purposes of illustration only, and do not limit the present invention. Modifications and other changes may be performed without departing from the overall spirit and scope of the present invention.

Overview

Figure 1:
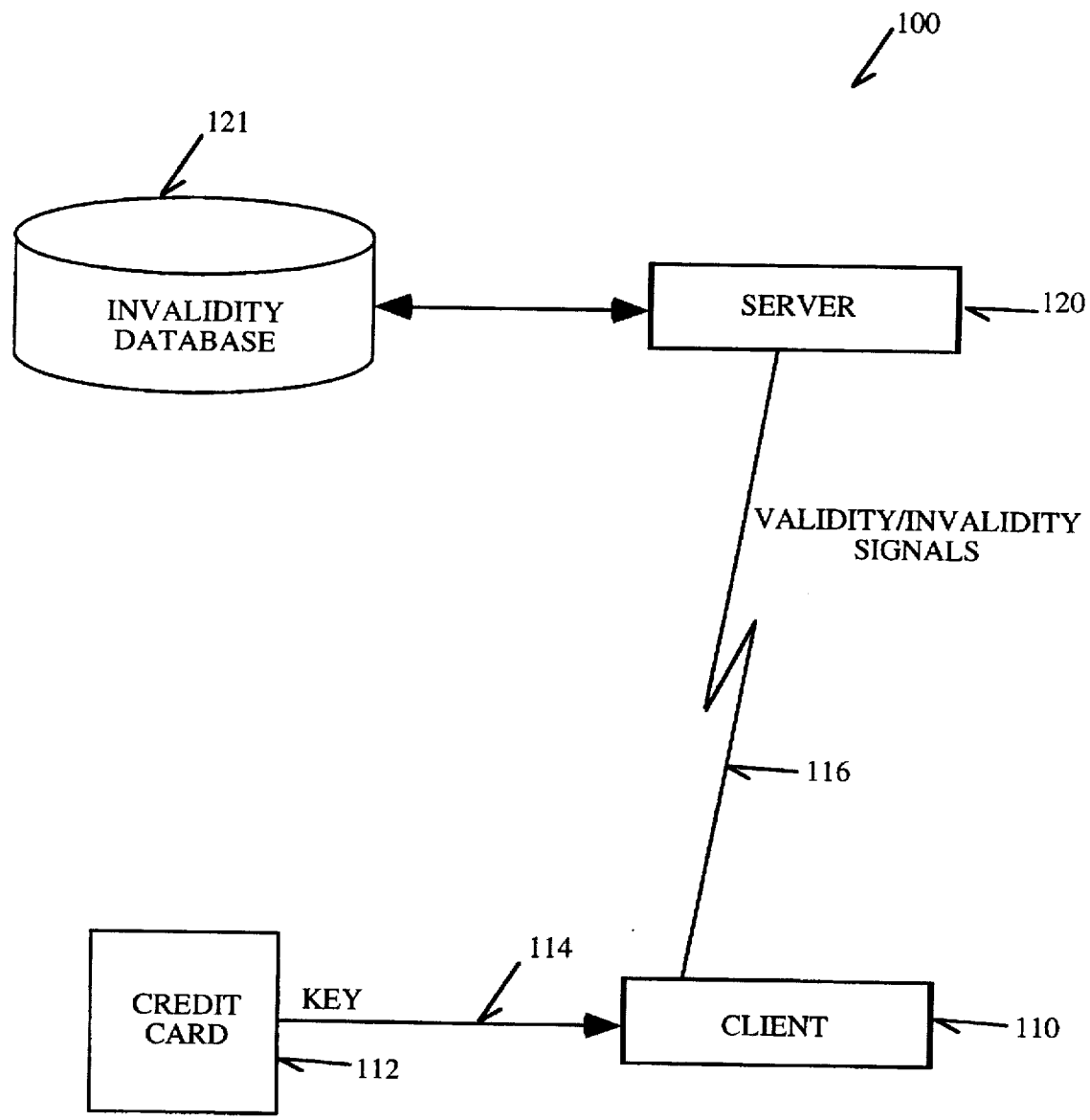
FIG. 1 shows a prior art validity determination system.
Figure 2:
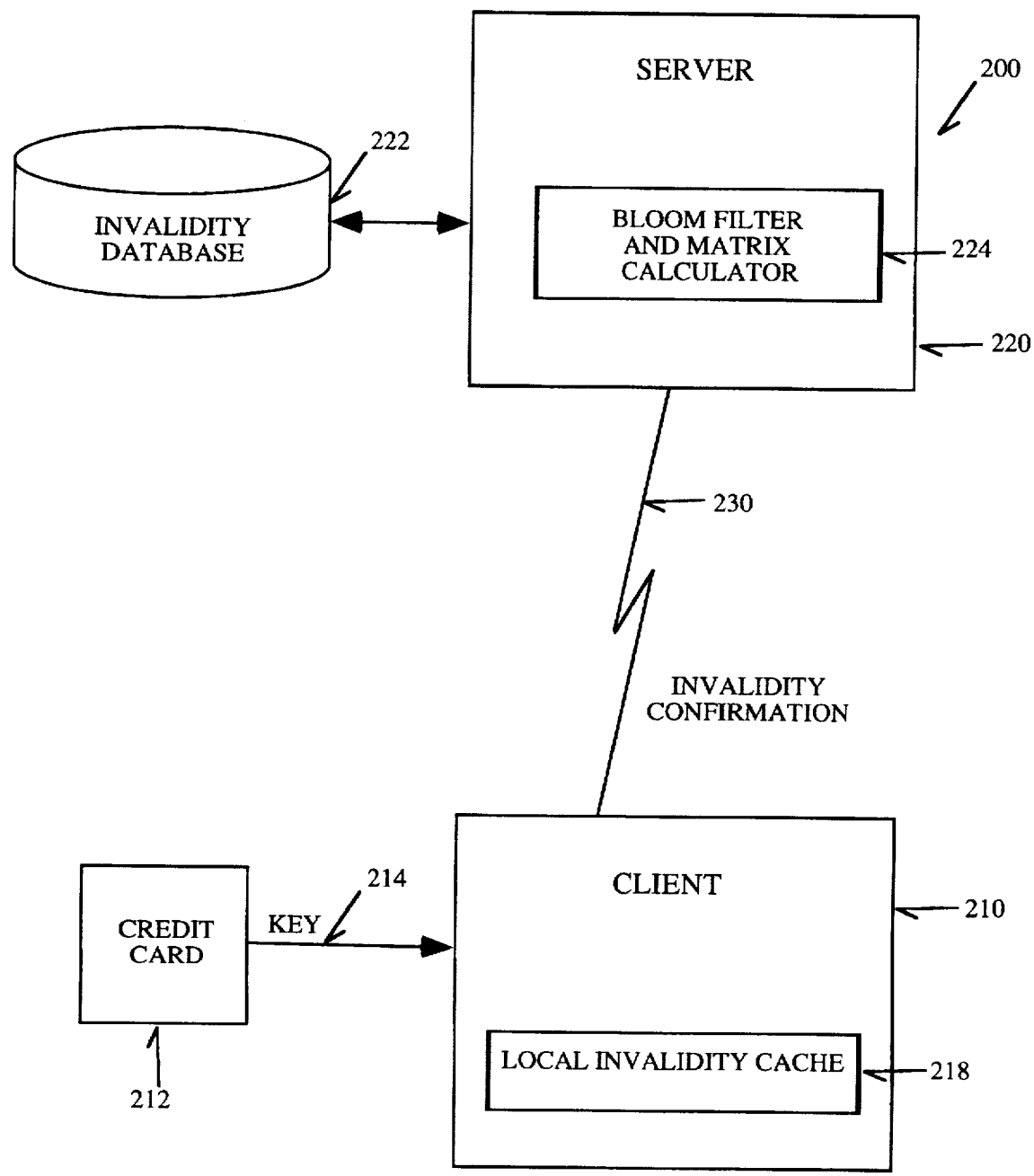
FIG. 2 shows an invalidity detection system.

FIG. 2 illustrates a system which is used for invalidity detection of keys in implemented embodiments of the present invention. A client system 210 accepts a key, a unique value 214, for example, the number of a credit card 212. The database 222 may include a list of revoked credit card numbers, ID badge numbers, or other unique values which are no longer valid. The client determines whether the key is in invalidity database 222 to determine whether a transaction will be allowed to proceed.

Upon receipt of a key 214 the client 210 performs a lookup in a local invalidity cache 218. A response signal indicating the results of the lookup in the local invalidity cache 218 is now generated. As will be described, local invalidity cache 218 comprises a bloom filter which is generated by performing one or more hash functions of the invalid keys contained in the invalidity database 222 stored in the server. If a lookup in the local invalidity cache 218 indicates that the key is not a member of invalidity database 222, then the key is guaranteed to not be a member of invalidity database 222. In this case, no communication between the client 210 and server 200 need take place.

If the local invalidity cache 218 indicates that the key is a member of invalidity database 222, then this may or may not be true. In that instance, the client may perform an invalidity confirmation process wherein the client communicates with the server 220 and requests a lookup to confirm the key's membership in invalidity database 222. No invalidity confirmation process need take place if the client can accept the possibility of the key actually being valid, within an error measure α. In the case of a database lookup, server 220 provides signals 230 to client 210 indicating whether the key is or is not a member of database 222. There is a possibility that a finding of membership in the local invalidity cache by the client will result in membership not being found in invalidity database 222, however, the error α is calculable and is relatively small. The error α may be used by the client to determine the local invalidity cache's accuracy and may determine whether a lookup is even required in some implementations.

Local invalidity cache 218 is a bloom filter of all the invalid keys in the database 222. Server 220 includes a bloom filter/matrix calculator 224 which generates bloom filters for-various parameters at periodic intervals from invalidity database 222. The bloom filter and matrix calculator 224 accesses invalidity database 222, and hashes all keys contained within the database for a range of parameters, error values, number of coefficients of the hash functions, and a prime key value which is used during the process for determination of whether the key is a member of the local invalidity cache 218. Any of the bloom filter vectors, coefficients, and prime key values may be downloaded from server 220 by client 210 upon demand, at regular intervals, or other defined intervals according to the established protocol. In implemented embodiments, the bloom filter vectors, coefficients and parameters stored in the matrix 224 may be computed at some interval, such as the beginning of the business day or when the invalidity database 222 is updated by some threshold measure.

Computer System

Figure 3:
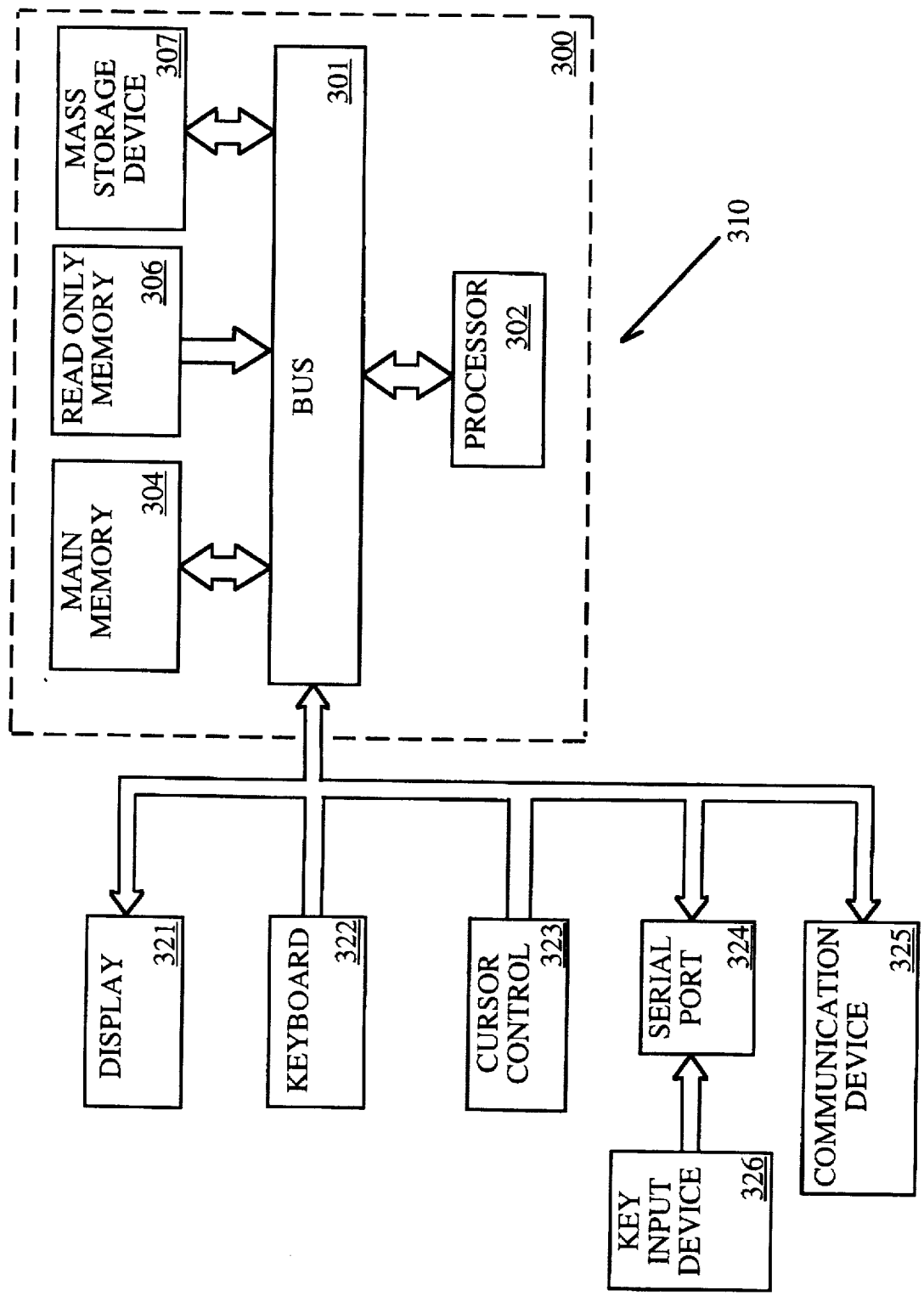
FIG. 3 shows a computer system in which either a client and/or a server may be implemented.

Referring to FIG. 3, a system 310 upon which one embodiment of a computer system (e.g. client 210 or server 220) of the present invention as implemented is shown. 310 comprises a bus or other communication means 301 for communicating information, and a processing means 302 coupled with bus 301 for processing information. System 310 further comprises a random access memory (RAM) or other volatile storage device 304 (referred to as main memory), coupled to bus 301 for storing information and instructions to be executed by processor 302. Main memory 304 also may be used for storing temporary variables or other intermediate information during execution of instructions by processor 302. System 310 also comprises a read only memory (ROM) and/or other static storage device 306 coupled to bus 301 for storing static information and instructions for processor 302, and a data storage device 307 such as a magnetic disk or optical disk and its corresponding disk drive. Data storage device 307 is coupled to bus 301 for storing information and instructions.

System 310 may further be coupled to a display device 321, such as a cathode ray tube (CRT) or liquid crystal display (LCD) coupled to bus 301 for displaying information to a computer user. An alphanumeric input device 322, including a alphanumeric and other keys, may also be coupled to bus 301 for communicating information and command selections to processor 302. An additional user input device is cursor control 323, such as a mouse, trackball, stylus, or cursor direction keys, coupled to bus 301 for communicating direction information and command selections to processor 302, and for controlling cursor movement on display 321.

In implemented embodiments, another device which may be coupled to bus 301 includes a serial interface 324. This may be coupled to a key input device 326 which can automatically input a key. This type of device may include a bar code, OCR (Optical Character Recognition), magnetic reader or other type of automatic key input device.

System 310 may also include a communication device 325 which comprises a means for communicating with other devices. This communication device may also include a means for communicating with other nodes in a network or across telephone lines. In implemented embodiments, this may include a MOdulator/DEModulator (MODEM) for communication between client 210 and server 220. Note, also, that any or all of the components of system 310 and associated hardware may be used in various embodiments, however, it can be appreciated that any configuration of the system that includes a processor 302 may be used for various proposes according to the particular implementation.

In one embodiment of a client 210, system 310 my be one of the IBM AT-compatible type personal computers such as the Gateway 2000 brand personal computer manufactured by Gateway Computer Systems. Processor 302 may be one of the Pentium® brand microprocessors available from Intel Corporation of Santa Clara, Calif. (Pentium and Intel are trademarks of Intel Corporation).

Note that the following discussion of various embodiments discussed herein will refer specifically to a series of routines which are generated in a high-level programming language (e.g., the C or C++ language) and compiled, linked, and then run as object code in system 310 during run-time. It can be appreciated by one skilled in the art, however, that the following methods and apparatus may be implemented in special purpose hardware devices, such as discrete logic devices, large scale integrated circuits (LSI's) application-specific integrated circuits (ASIC's), or other specialized hardware. The description here has equal application to apparatus having similar function.

The Invalidity Database

Database 222 contains N items. Each item in the database is uniquely identified by a key Q so that there are $Q_1 \ldots Q_w \ldots Q_N$. Each key, $Q_w$, consists of t bytes q such that $Q_w = q_{w1} \ldots q_{wi} \ldots q_{wt}$. A bloom filter is used in implemented embodiments for the local invalidity cache 218. No search in invalidity database 222 need be performed if the key is not present in local invalidity cache 218. Database 222 may be, for example, a database of revoked credit cards. A bit vector, B, is maintained in the local invalidity cache 218, so that most keys not in the file can be recognized as absent without making any references to database 222.

An internal bit vector, B, known as a Bloom vector is stored in client 210 with bits $b_0 b_1 \ldots b_{M-1}$, where M is rather large. During creation of the Bloom Vector by the server 220, each bit $b_x$ of B is initially set equal to 0. For each key Qw in the file, k independent hash functions, $H_1(Q_w) \ldots H_j(Q_w) \ldots H_k(Q_w)$ are computed by the server and the corresponding k b's are set equal to 1 in the bloom vector. (These k values need not be distinct.) Thus $b_x=1$ iff $H_j(Q_w)=x$ for some j and w.

To determine if a search argument Q is in the external database using the Bloom vector, client 210 first tests whether or not $b_x$ is equal to 1 for $H_j(Q)=x$. If it is not, then Q is guaranteed to not be in the database 222. If it is set equal to 1 then each of the k hash functions are continued to be tested. If all k hash functions correspond with bits equal to 1 then Q is in the external database 222 with a certain probability 1−α. The probability of a "False positive" α when there are N records in the database 222 is:

$$\alpha = [1 - e^{\frac{bN}{M}}]^k$$

Some prior art systems employ bloom filters which are static storage devices with k and M fixed and with N varying. In implemented embodiments of the present invention, N is fixed at any given time. That is, there are N members in the database 222. Embodiments provide a method for constructing a Bloom filter B encoding the N members of the database 222 in a way that allows α, k, and M to be chosen to optimize the vector B for client 210's needs.

In one embodiment of the present invention a function is used:

$$\Gamma(x) = p$$

where p is the next prime number greater than the number x. This may be accomplished using any number of techniques including Euclid's or Verasmus' theorems. The Bloom vector B is modified so that the calculated or chosen value M is replaced by $$\Gamma(M) = p_M$$

so that B is a vector of $p_M$ bits. A set of k hash functions, $H_1(Q_w) \ldots H_j(Q_w) \ldots H_k(Q_w)$ are used by the sever 220 that map uniformly over B where $$H_j(Q_w) = \Gamma\left(\frac{j}{k+1} p_M\right) \prod_{i=1}^{t} q_{wi} \bmod p_M$$

The function $H_j(Q_w)$ maps uniformly over B as long as $$\Gamma = \left(\frac{j}{k+1} p_M\right) \prod_{i=1}^{t} q_{wi} >> p_M$$

Constructing hash functions in this manner allows for an arbitrary number of hash functions. Thus, k, M, and α can be varied for a given N.

Client 210 uses the bloom vector B to verify membership of item Q in database 222 with the client 210 off-line from the server 220. The server 220 varies the number of hash functions H(Q) in order to maintain the Bloom filter's efficiency. An arbitrary number of hash functions is stored in a matrix and the client 210 and server 220 negotiate the Bloom filter parameters, k, M, and α for a given number of invalid keys N.

Figure 4:
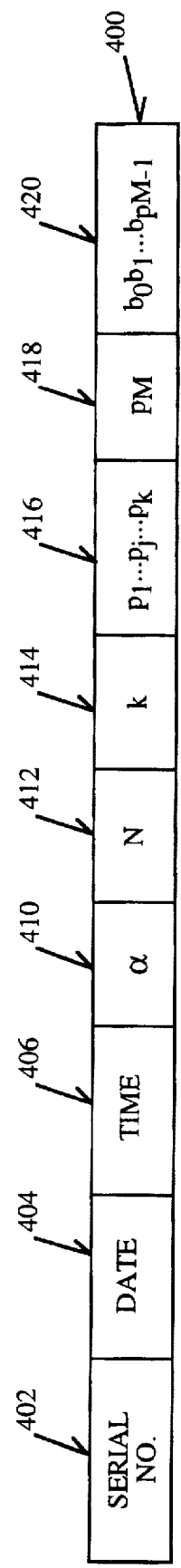
FIG. 4 shows the format of a data string which is returned from a server for a current bloom filter to be stored in the client.

Server 210 maintains the database 222 of items (e.g. invalid credit card numbers). For a given value of N, the server computes an optimized Bloom vector for each parameter of interest. Thus, there are Z bloom vectors $B_1 \ldots B_r \ldots B_z$. The server then stores each of these Bloom vectors in a data string 400 as shown in FIG. 4. These are accessible via a bloom filter matrix addressable by the three parameters.

The Bloom Filter String

Bloom vector strings are downloaded by a client from a server to determine the possible database membership of a key. A bloom filter suing 400 illustrated in FIG. 4 has a serial number 402 which is a unique sequential identifier for the data suing. This number may be used by a client to determine if it has the most up-to-date vector. The Date and Time fields 404 and 406 containing the date and time of the vector's creation for a similar purpose. The error value α in field 410 is the probability of a false positive when using the vector to test a key. The values N and k stored in fields 412 and 414 are the other parameters used in the vector's construction.

The hash function $$H_j(Q_w) = \Gamma \left( \frac{j}{k+1} p_M \right) \prod_{i=1}^{t} q_{w_i} \bmod p_M$$

can be rewritten in the form:

$$p_j \, J(Q_w) \bmod p_M$$

where $$p_j = \Gamma = \left( \frac{j}{k+1} p_M \right) \text{ and } J(Q_w) = \prod_{i=1}^{t} q_{w_i} \bmod p_M$$

Thus, the values $p_l \ldots p_j \ldots p_k$ contained in field 416 correspond to the $p_j$ for a given k and $p_M$. The remaining portion of the data string is field 418 containing the prime key $p_M$ and the bits, $b_0 b_1 \ldots b_{pM-1}$ in field 420 that constitute the actual vector. The server may also create multiple Bloom vectors, B, based on any other combination of parameters such as those for a given k.

Client Functional Block Diagram

Figure 5:
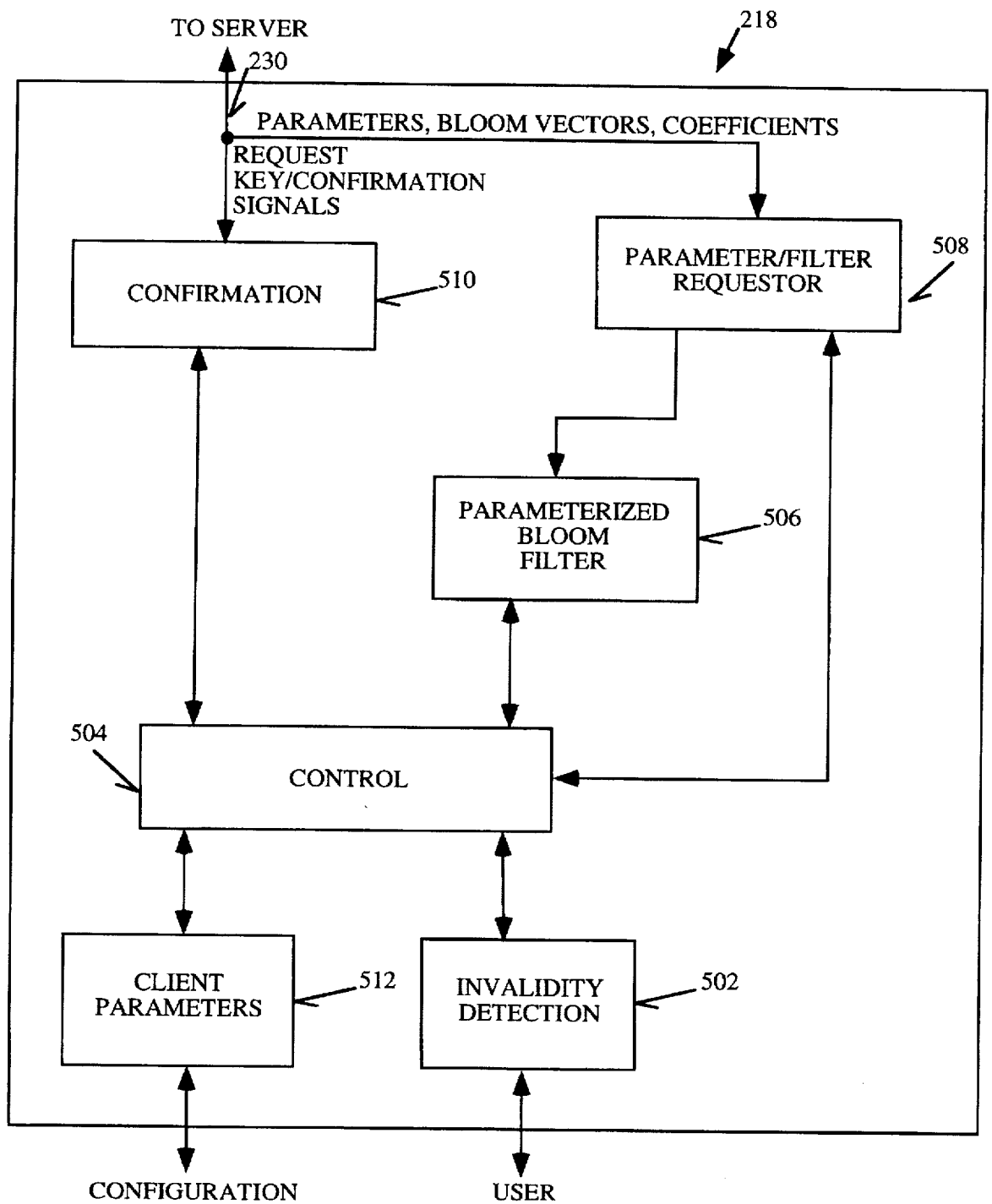
FIG. 5 shows a functional block diagram of processes or dedicated circuitry which may be contained within a client for providing the function of a local invalidity cache of an invalidity database.

FIG. 5 illustrates a functional block diagram of processes which are present in client 210 for performing the functions of the local invalidity cache 218. Invalidity cache 218 in FIG. 5 may include processes which are resident within memory of the client during the client's runtime, or alternatively, be dedicated circuitry such as firmware, or discrete circuitry for performing the described functions.

Local invalidity cache 218 includes an invalidity detector 502 which receives as an input a key and provides as an output a valid/invalid signals to a user. The invalidity detector 502 communicates with a control circuit 504, which interacts with the parameterized bloom filter 506. If circuit 506 indicates that the key is possibly a member of the database, via the assertion of an invalid signal, then control 504 activates confirmation module 510 which interacts with server 220 to request a database lookup within database 222. The key and request signals are sent over communication link 230 to server 220.

Bloom filter 506 further communicates with parameters filter request module 508 which requests and obtains the coefficients and bloom vectors from the server 220. Module 508 negotiates with server 220 in order to provide the client-required parameters of the bloom filter to the server, and receive the bloom filter string 400.

The desired parameters, if any, α, k, and M are provided by client parameters circuit 512 which receives and stores the time/space requirements configured within client 210. These are also provided to the parameter/filter request module 508. Module 508 may be operative at various periodic intervals, including when the bloom filter contained within bloom filter 506 becomes out of date, and a request for a key lookup in the invalidity cache 218 is performed in client 210. Bloom filters may also be updated at other periodic intervals such as the beginning of a business day, or when the serial number and/or date of the bloom filter changes. Other periodic intervals may be used for updating of the bloom filter in different implementations.

Server Functional Block Diagram

Figure 6:
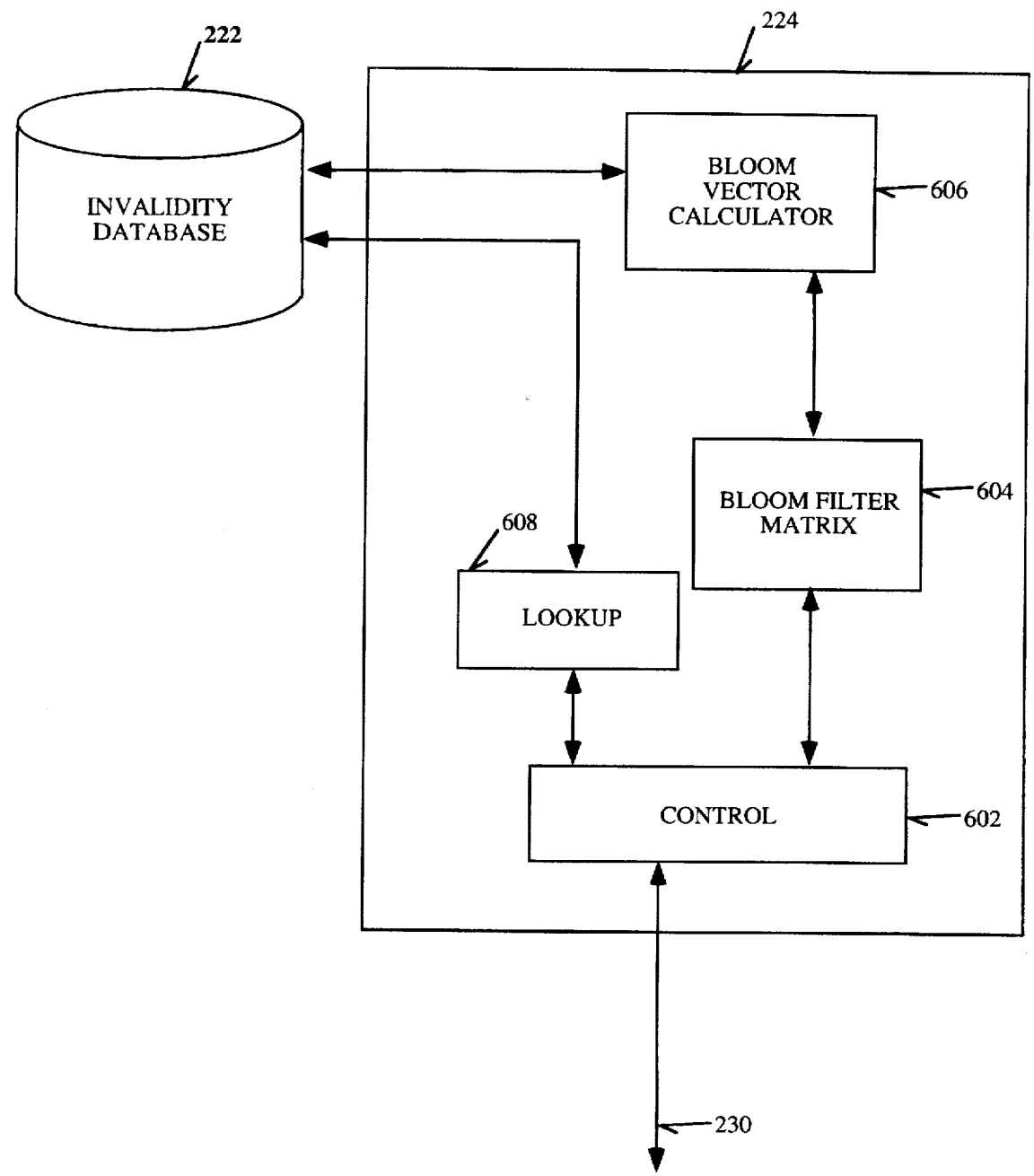
FIG. 6 shows a functional block diagram of processes or circuitry contained within a server which provides membership confirmation signal(s), bloom filter coefficients and vectors to a client upon request.

FIG. 6 illustrates a functional block diagram of bloom filter calculation circuit/matrix 224 in server 220 illustrated in FIG. 2. These may also be processes resident in computer system memory of server 220. Module 224 includes a control module 602 which receives parameters, keys, request signals to and provides coefficients, vectors and other information from the server 220 over communication medium 230. According to operating circumstances, control module 602 controls and communicates with the bloom filter matrix 604, the bloom vector calculator 606 and lookup module 608. In the event of a lookup request from a client, control circuit 602 causes lookup module 608 to access database 222. Responsive thereto, the results, whether the key is present or not present in database 222, is then provided to client 210.

In the event of a request of an update of the bloom filter contained within the client, the control module 602 communicates with bloom filter matrix 604 and, according to the parameters provided to the server, accesses the appropriate bloom filter string containing the client-specified parameters, α, k, and M, as well as the coefficients $p_l \ldots p_k$ of the hash functions, the bloom vector B and the prime key $p_M$. Control module 602 negotiates with client 210 in order to obtain the requested bloom filter string according to the client's time/space requirements.

Circuit 224 further includes the bloom vector calculator 606. Bloom vector calculator 606 is operative at periodic intervals, when control module 602 determines that a new bloom filter matrix 604 is desired to be calculated. This may occur at various periodic intervals, such as once a business day, upon a threshold increase in the number of invalid keys contained within database 222, or some other update criteria. Bloom vector calculator 606 accesses invalidity database 222, and the values of M, k, and α and calculates the coefficients and the vectors of the bloom filter string for the various parameters. These are then placed in the bloom filter matrix 604 for accessing of bloom filter string by clients upon request.

Client Processing

Figure 7:
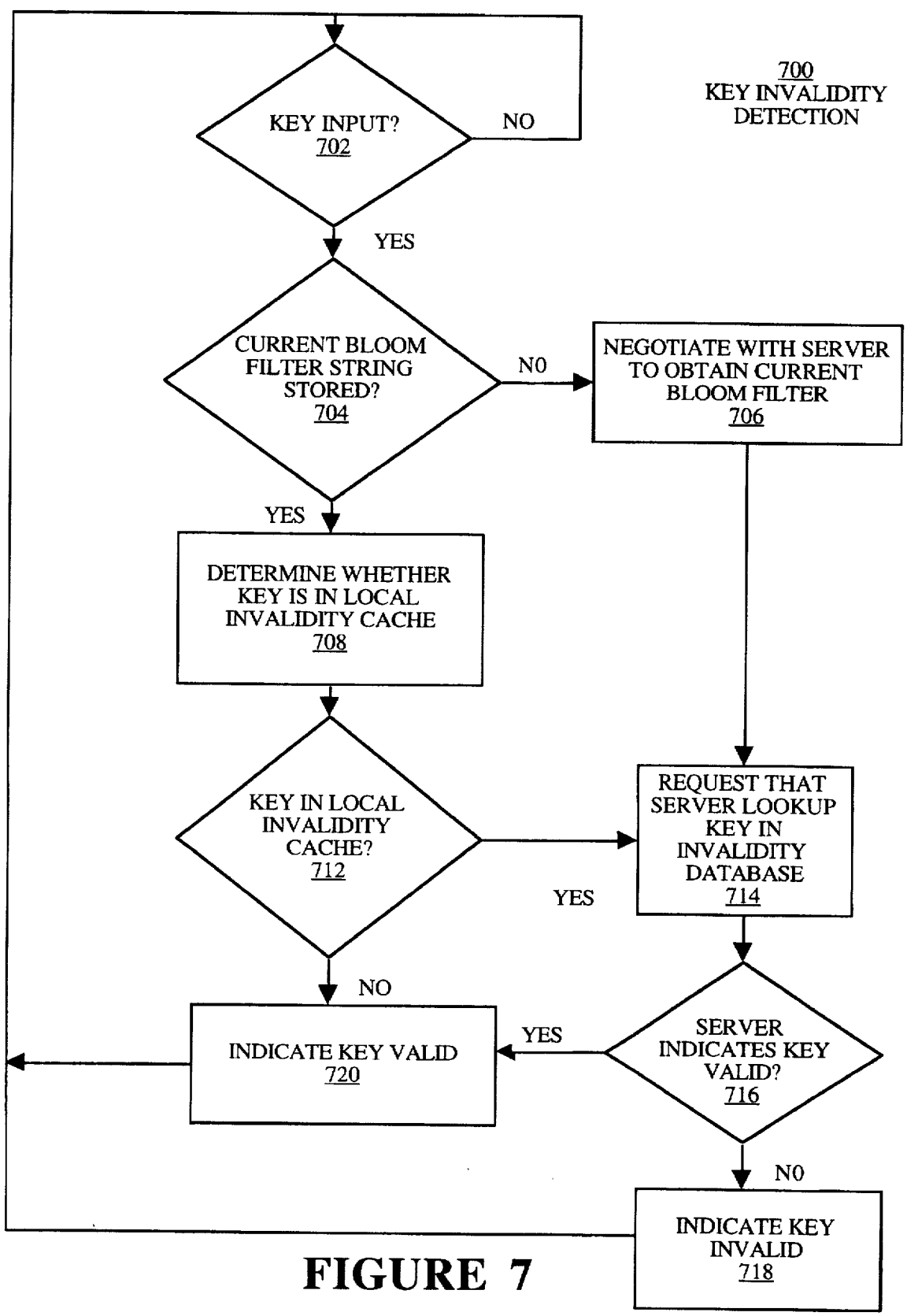
FIG. 7 shows a process which is performed for key invalidity detection within a client.

The process performed within the client for key invalidity detection is shown as 700 in FIG. 7. For the purposes of this embodiment, the client awaits input at step 702 of a new key which the user wishes to check for invalidity at step 702. Once a key is input, as detected at step 702, it is determined at step 704 whether the bloom filter string stored in the client is the current bloom filter string. This may be performed in any number of manners, including but not limited to, the checking of the serial number against a serial number broadcast by the server, the checking of a date if updates of the bloom filter are performed on a daily basis, or other pre-established protocol between the client 210 and the server 220.

If the current bloom filter has not been stored in the client, as detected at step 704, then at step 706, the client negotiates with the server to obtain the current bloom filter. This process may include specification by the server of the range of parameters that is capable of providing bloom filter coefficients and vectors for, as well as step values indicating the step size between available parameters within the range. Other negotiation protocols may be performed. Once the new bloom vectors have been retrieved, because the connection has already been established with server 220, a key lookup may be requested to be performed by server 220 at step 714.

If the current bloom filter string has been stored in the client 210 then, at step 708, the key is checked to determine if it is present in the local invalidity cache 218 at step 708. The determination of whether the key is in the local invalidity cache is performed using the coefficients of the hash functions, $p_1 \ldots p_k$, the prime key $p_M$, and the bloom vector $b_0 b_1 \ldots b_{pM-1}$. The details of the determination of whether the key is in the local invalidity cache is discussed in more detail with reference to FIG. 11.

Subsequent thereto, if the key is detected as being present in the local invalidity cache as detected at step 712 then the client requests a lookup of the key in the invalidity database 222 by server 220 at step 714. If the key is not in the local invalidity cache, then the key is indicated as valid to the user at step 720, and the process returns to step 702 for the detection of the input of additional keys. Thus, in the instance where the key is not in the local invalidity cache 218, it is guaranteed that the key is not in the invalidity database 222, and no communication between the client 210 and the server 220 need take place.

In the event that the local invalidity cache indicates that the key is present, there is still a probability $\alpha$ that the key may not be present in the invalidity database 222. Thus, a key lookup must be performed at step 714 in the server 220 in order to ensure that the key is a member of invalidity database 222. In some implementations, no such lookup may be required to take place if the error $\alpha$ is acceptable. At step 714, a key lookup request is sent to the server 220 with the key in a request signal to server 220 by the client 210. Then, at step 716, it is determined whether the server indicates whether the key is valid or not. That is, if the key is indicated as valid, then the key was not present in invalidity database 222. The user is then notified at step 720 that the key is valid. If, however, the server indicates that the key is invalid as detected at step 716, then the user is alerted at step 718 that the key is invalid. The key is a member of invalidity database 222.

Figure 8:
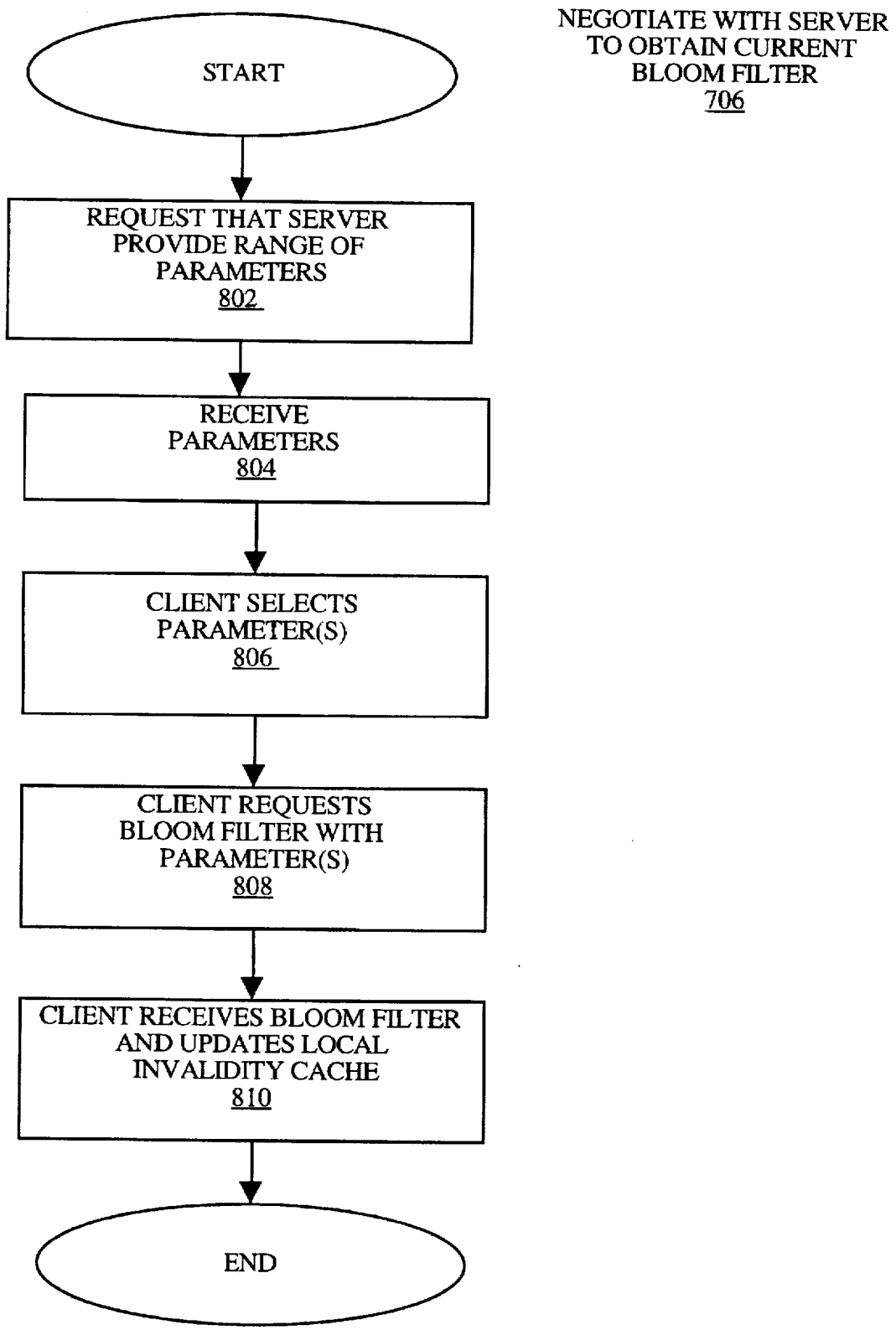
FIG. 8 shows a process performed by a client for negotiation with a server to obtain a current bloom filter string.

FIG. 8 illustrates the process 706 in more detail which shows the negotiation process from the client's perspective for the current bloom filter string. Although 706 was shown within the key invalidity detection process 700, it can be appreciated by one skilled in the art that this may be performed at any periodic interval, such as a predetermined time or at daily intervals. However, the embedding of step 706 within a key invalidity detection process 700 above optimizes the transfer of the bloom filter strings between the server and the client to time periods in which actual key lookups are required to be performed in the client 210. Thus, the bloom filter will be updated when communication links are otherwise already established.

Figure 9A:
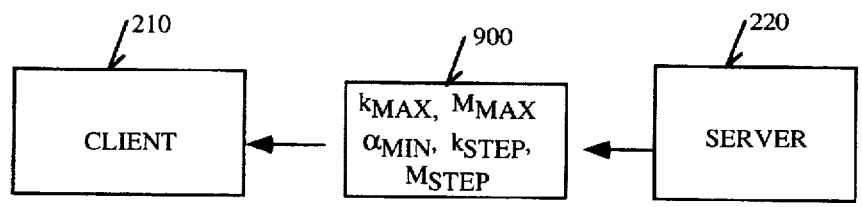
FIGS. 9a–9c show a series of messages which may be transmitted between a client and a server in order to make available a current bloom filter to a requesting client.
Figure 9B:
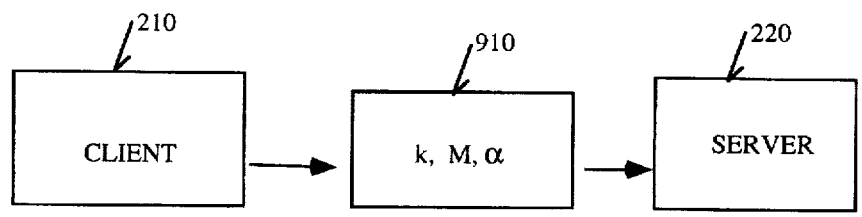

Process 706 starts at step 802 wherein the client requests the range of parameters supported by the server. At step 804, the client receives the available parameters from the server. For example, FIG. 9a illustrates the receipt of the range of parameters for k and M including $k_{MAX}$ or $M_{MAX}$ (the maximum values of M and k), $\alpha_{MIN}$, (the minimum error value), and step sizes for any of these values (e.g. $k_{STEP}$, $M_{STEP}$, $\alpha_{STEP}$). Once these values are received by the client, the client can select the parameters of interest, if any are desired, at step 806. This is illustrated in FIG. 9b, wherein the relevant parameters k, M, and $\alpha$ are transmitted 910 to server 220 by client 210. If any parameters are not specified (at least two are required to obtain a unique bloom filter), then appropriate default values may be used by the server for providing the bloom vectors to the client.

Figure 9C:
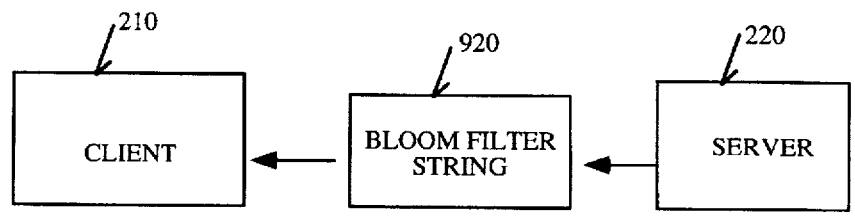

At step 808, the client requests the appropriate bloom filter suing with the specified parameter(s), if any. At step 810, the client then receives the bloom filter string 920, as illustrated in FIG. 9c. The local invalidity cache 218 is thus updated.

Bloom Vector Calculator

Figure 10:
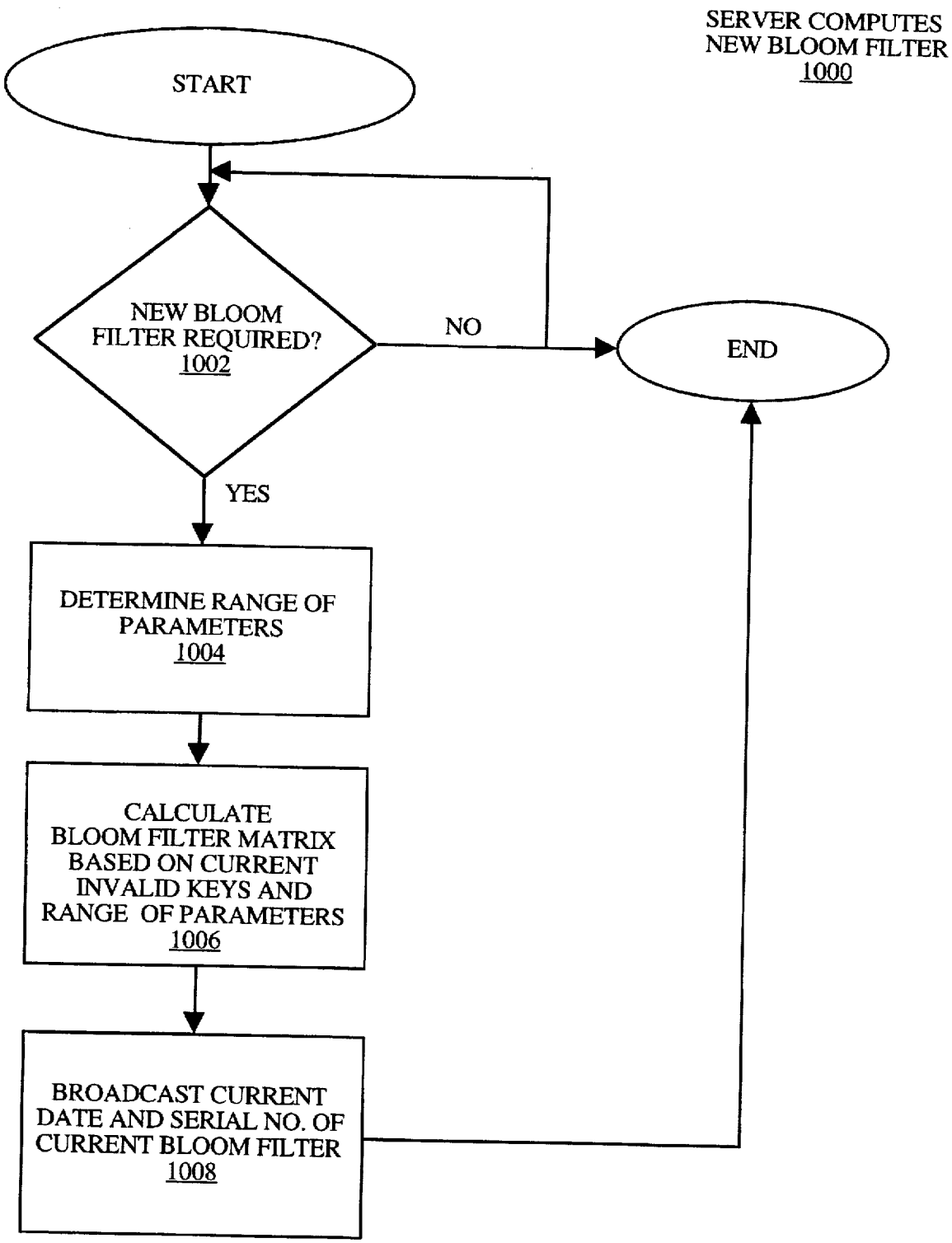
FIG. 10 shows a sequence of steps performed within a server for updating a bloom filter matrix which is used for providing bloom filters to requesting client(s).

FIG. 10 illustrates the process 1000 which may be performed by bloom vector calculator 606 in FIG. 6 at periodic intervals when a new bloom filter is required to be computed in server 220. This process is thus performed for the entire range of M's, k's and $\alpha$'s which the server supports. Process 1000 is performed at a periodic interval, such as a daily invalidity database update time period. Thus, all computation may be performed off-line by the server and the new bloom filter strings are made available to clients upon request. Process 1000 commences at step 1002 and determines whether a new set of bloom filters is required or not. Whether a new set of bloom filters is required may be determined based upon any of a number of circumstances, including a threshold number of new invalid keys, a daily bloom filter update period or other implementation-specific determination. Then, at step 1004, the range of parameters is determined. At step 1006, the bloom filter matrix is calculated based upon the current invalid keys and the range of parameters which are desired to be maintained by the server. In this implementation, subsequent to the calculation of the bloom filter matrix, the server may broadcast the current date and serial number of the current bloom filter strings available to potential clients of the server. Other embodiments of this invention may also be performed wherein clients are notified on a regular basis of the new serial number and date of the bloom filters, upon an initial connection with a client to determine whether the client's serial number and/or date is out of date, or other implementation-specific protocol. Upon completion of step 1008, process 1000 is thus complete.

Local Invalidity Cache

Figure 11:
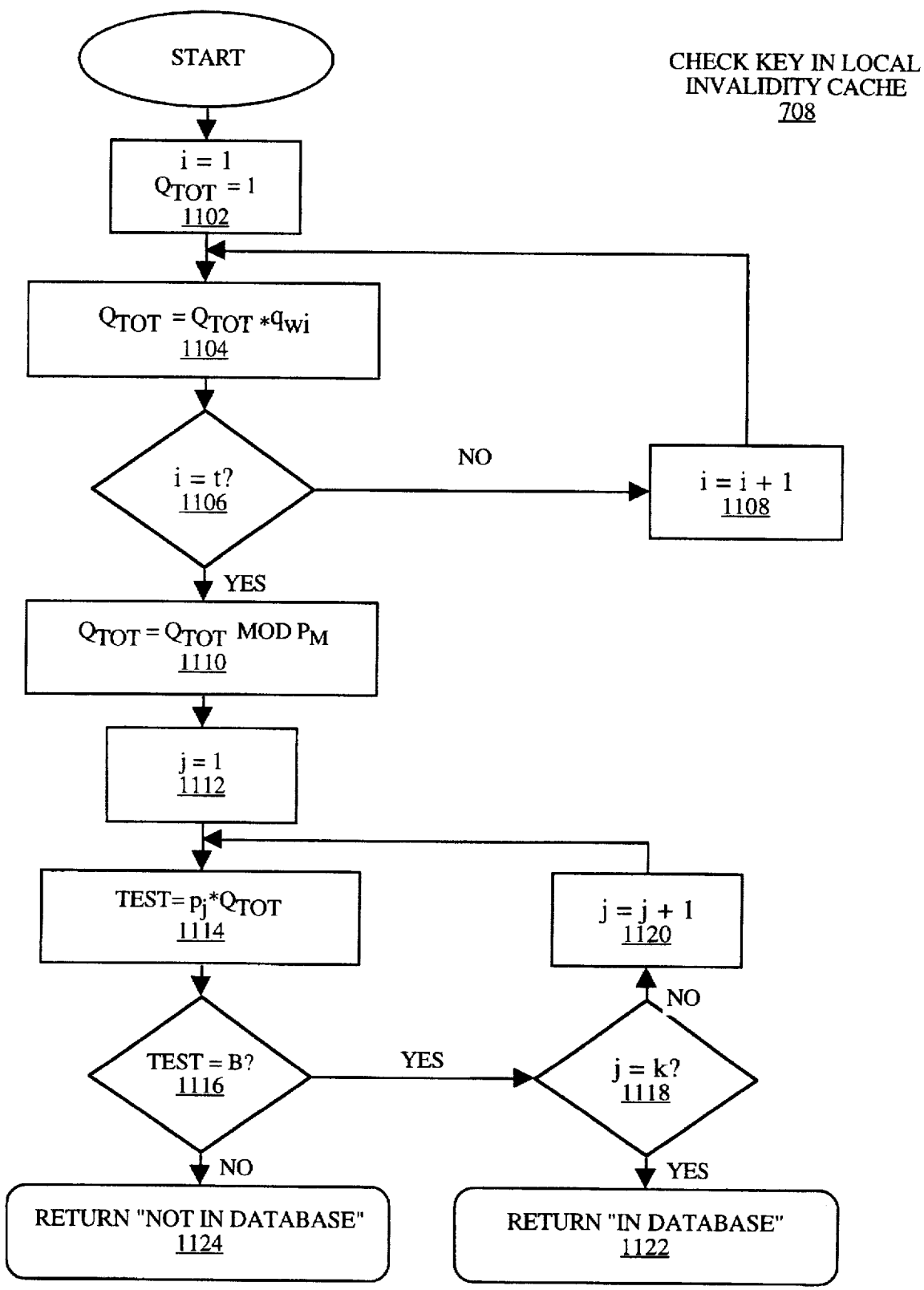
FIG. 11 shows a sequence of steps performed within a client for determining whether a key is in the local invalidity cache.

FIG. 11 illustrates the details of process 708 which determines whether the key is in the local invalidity cache 218. Process starts at step 1102 which initializes the variables i and $Q_{TOT}$. Then, at step 1104, the product of all the t bytes $q_{w_i}$ of the key $Q_w$ are accumulated in the $Q_{TOT}$ value. It is then detected at step 1106 whether i is yet equal to t, the total number of bytes contained within the key. If not, i is incremented at step 1108, and steps 1104–1108 continue until the product of all the t bytes $q_{w_i}$ in the key have been accumulated in $Q_{TOT}$.

Once all of the t bytes have been accumulated in $Q_{TOT}$ then, at step 1110, a modulo (MOD) is performed of the accumulated $Q_{TOT}$ value using the prime key $p_M$. This is performed at step 1110. Continuing at step 1112, the index j is initialized to 1. This will then allow the checking of all of the bytes in the bloom vector B against the product of each of the parameters and the $Q_{TOT}$ value. At step 1114 the variable TEST is set equal to the product of the current parameter $p_j$ and $Q_{TOT}$. It is then determined at step 1116 whether TEST has the same bit pattern as bloom vector B. If not, then the process returns at step 1124 indicating that the key is not present in the local invalidity cache 218, and thus it is not present in the invalidity database 222. It is therefore guaranteed that the key is valid—it is not a member of invalidity database 222. No communication with server 220 need take place.

Step 1116 is a bitwise comparison of the bits set in the variable TEST and corresponding bits in the bloom vector B. Thus, the step 1116 comprises testing for each set bit in the variable TEST whether the corresponding bit in the bloom vector B is set. If not, then step 1116 yields a negative result —TEST is not equal to B. If the bit is set, then the next set bit in TEST is checked against the corresponding bit in B, and this pattern continues until all of the set bits in TEST have been compared against the corresponding bits in B. Thus, this further improves the efficiency of the local invalidity cache because all bits in each hashed key value stored in TEST do not have to be checked if one is not set in the corresponding bloom vector B. In addition, no additional coefficients of the hash functions need to be applied to the key because one corresponding unset bit in the bloom vector B also causes the test to fail for all remaining untested hash function coefficients.

In the event that TEST has the same bit pattern as bloom vector B, as detected at step 1116, it is then detected at step 1118 whether all the coefficients have been checked, that is, that j=k. If j is not equal to k, then j is incremented at step 1120, and steps 1114–1118 repeat. This process continues iteratively until all of the coefficients $p_k$ have been checked or TEST is not equal to B. Once all of the parameters have been checked to determine whether the bits set in the bloom vector B are equal to the bit pattern $p_j * Q_{TOT}$ then j=k. In that event, process 708 then proceeds to step 1122 and the process returns indicating that the key may be present in invalidity database 222. A confirmation via a lookup in server database 222 may be performed if required in the implementation. No database lookup need be performed in some implementations, as long as the error $\alpha$ is acceptable.

Process 708 is thus more efficient than prior art client/server techniques which always require a server lookup. Although some computation is required to be performed by the client, the advantage of conservation of communication resources, especially during high traffic intervals, outweighs any disadvantages posed by some local computation in the client.

Computation of Bloom Vectors

Figure 12A:
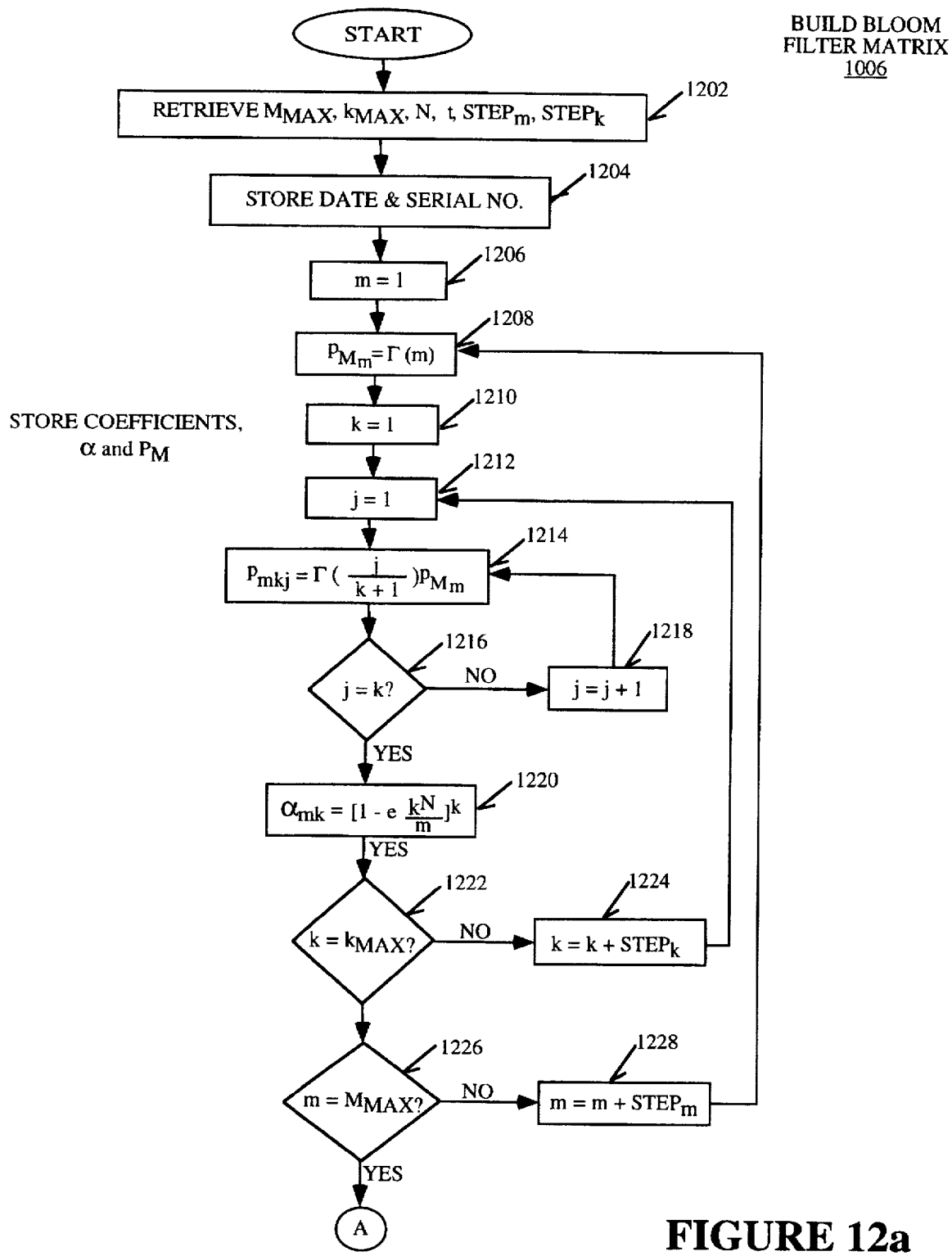
FIGS. 12a–12c shows details of the process performed within a server for calculating the bloom filter matrix.
Figure 12B:
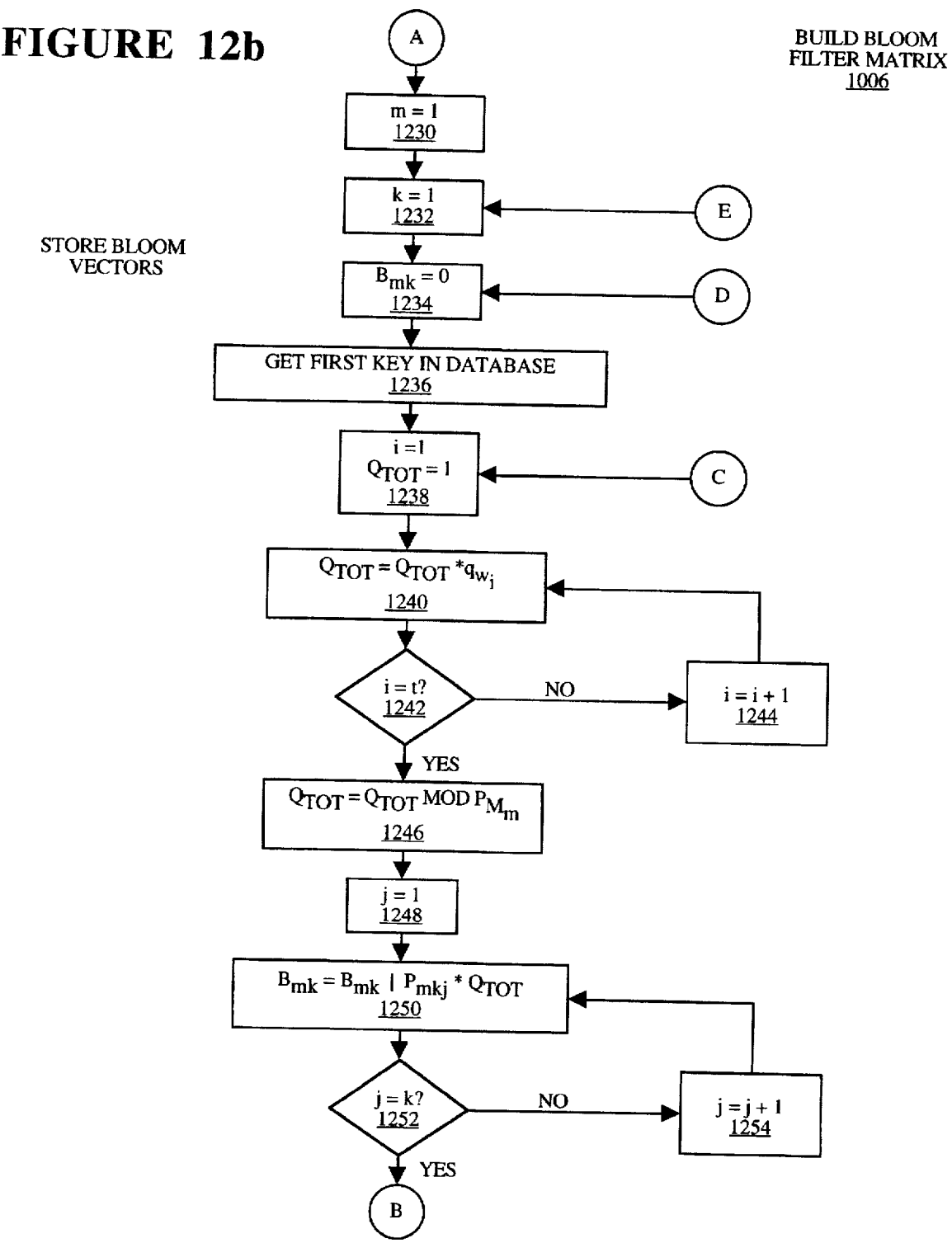
Figure 12C:
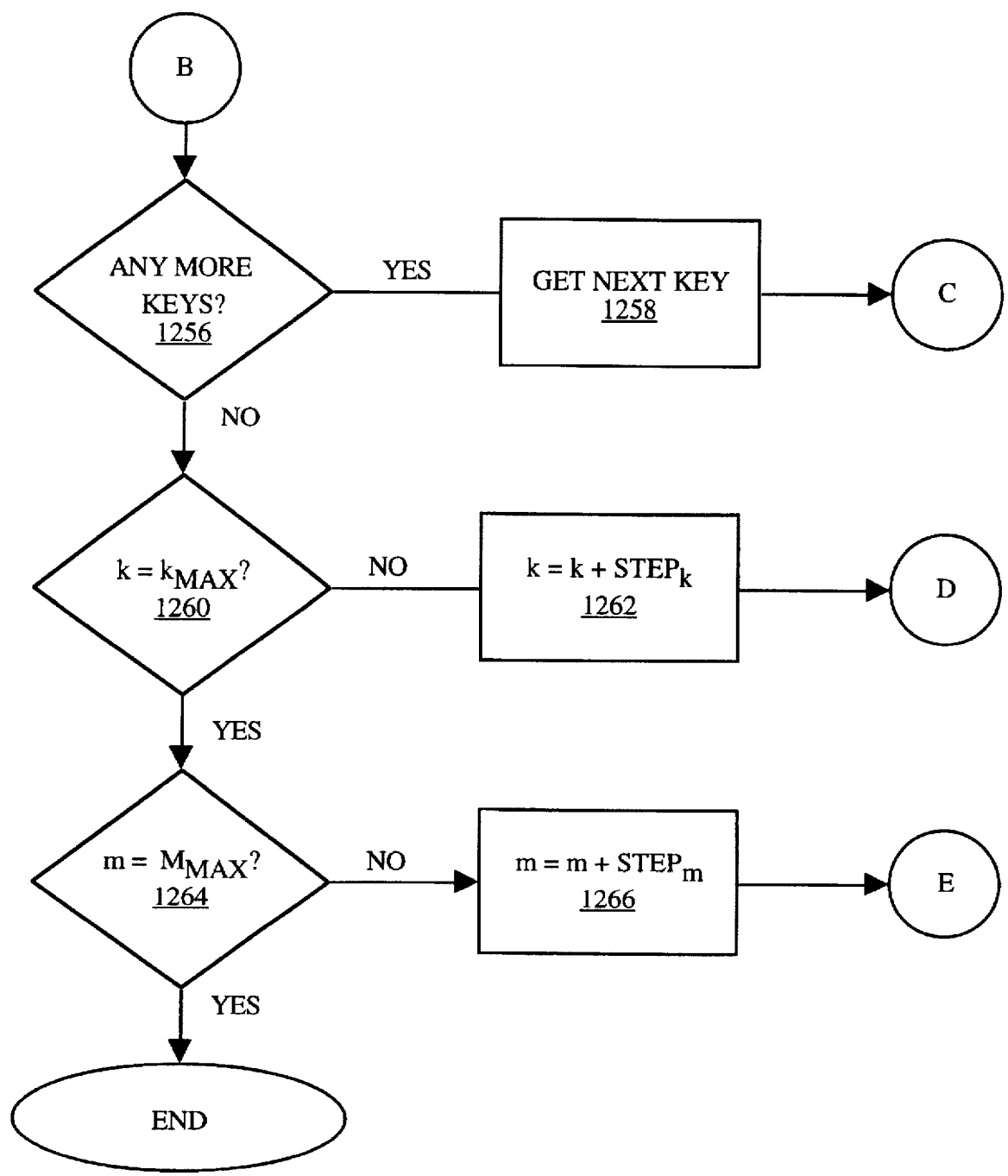

FIGS. 12a through 12c illustrate the bloom filter matrix calculation and build process 1006 which is performed in the server at some interval. As previously discussed, this interval may include when a threshold number of invalid keys are added to database 222, on a daily basis according to some predetermined scheduling algorithm, or any other implementation-specific interval. Upon the determination that a new bloom filter matrix should be created in the server, process 1006 starts at step 1202 to retrieve the range of parameters for which the bloom filter matrix will be created. These include a maximum value for M, $M_{MAX}$, a maximum value for k, $k_{MAX}$, the number of invalid keys N in database 222, and t, the number of bytes contained within each key. This also may include step sizes such as $STEP_M$, $STEP_k$ which define the necessary steps sizes between parameters supported by the server.

Then, at step 1204 the date and serial number which will be associated with the current bloom filter strings stored in the bloom filter matrix can be stored at step 1204. These are used by the client to determine whether the bloom vector string contained within a client 210 is current. Once these values have been stored, computation of the bloom filter matrix for the various parameters can commence.

At step 1206 an index m which is used for varying M for the matrix is initialized at step 1206. Step 1208 determines the $p_M$ value for m using a known technique. Then, at steps 1210 and 1212, the indices k and j are initialized to 1. At step 1214, the coefficients $p_{mkj}$ are computed for each of the varying values. These can be stored in a three-dimensional matrix which is addressable by specified values of m, k and j. In addition, an $\alpha$ value will be stored addressable by two parameters in a specified location in the matrix $\alpha_{mk}$ wherein a string can also then be retrieved based upon its $\alpha$ value. At any rate, at step 1216, it is determined whether all of the coefficients $p_{mkj}$ have been calculated. That is, that j=k. If not, then j is incremented at step 1218, and steps 1214–1218 iteratively continue until such time as j=k as detected at step 1216. Subsequent to the computation of the coefficients $p_{mkj}$ of the hash functions for the various m and k values, the $\alpha$ value is then computed and stored with the associated m and k values at step 1220. Subsequently, at step 1222, it is determined whether $k=k_{MAX}$. If not, k is incremented at step 1224 by $STEP_k$. Steps 1212 through 1224 are then performed iteratively until it is determined at step 1222 that $k=k_{MAX}$.

Subsequent to the determination that all coefficients have been now calculated for the current m value, at step 1226, it is determined whether all possible values of m have been used to calculate the coefficients stored in the matrix. That is, that $m=M_{MAX}$. If not, then at step 1228, m is incremented by $STEP_m$. Process 1006 returns to step 1208, and iteratively performs steps 1208–1228 until such time as all the possible values of m have been used for calculating the coefficients $p_{mk}$, the prime key $pM_m$ and $\alpha_{mk}$.

Upon completion of step 1226 and detection that the entire range of values of m have been used for calculation of the coefficients $p_{mkj}$, process 1006 continues on FIG. 12b. FIGS. 12b and 12c illustrate the portion of the process which is used for calculating the bloom vector B from each of the keys contained in invalidity database 222. At steps 1230 and 1232, the indices m and k are initialized to 1. At step 1234, the bloom vector $B_{mk}$ is initialized to zero. Then, at step 1236, the first key stored in invalidity database 222 is retrieved. Then, at step 1238, the index i and $Q_{TOT}$ are initialized to 1.

At step 1240, the product of the t bytes $^qw_i$ of the key $Q_w$ are accumulated in $Q_{TOT}$. It is then determined at step 1242 whether i is equal to t, that is, the product of all of the bytes in the key $Q_w$ have been accumulated in $Q_{TOT}$. If not, as detected at step 1242, then the index i is incremented at step 1244. Steps 1240–1244 continue iteratively until the product of all of the t bytes $^qw_i$ have been accumulated in $Q_{TOT}$.

Once the product of all the t bytes $^qw_i$ in the key $Q_w$ have been accumulated in $Q_{TOT}$, then at step 1246 a modulo of $Q_{TOT}$ is performed using the prime key $pM_m$. Once this has been performed, $Q_{TOT}$ is used for computation of the bloom vector $B_{mk}$. At step 1248, the index j is again initialized to 1. Then, the bloom vector $B_{mk}$ is set equal to a bitwise OR function ('|') of the current $B_{mk}$ value and the product of the coefficient $p_{mkj}$ multiplied by the $Q_{TOT}$ value at step 1250. It is then determined at step 1252 whether j=k that is, that all coefficients $p_{mkj}$ for the current m and k values have been hashed with the key and stored in bloom vector $B_{mk}$. If not, then step 1252 proceeds to step 1254 to increment j, and steps 1250–1254 are iteratively performed until j=k, as detected at step 1252.

Once the bloom vector $B_{mk}$ for the current m and k values has been computed based on all the coefficients $p_{mkj}$ and this invalid key, then process 1006 proceeds to step 1256 of FIG. 12c. Step 1256 of FIG. 12c determines whether there are any more keys contained in invalidity database 222. If so, then the next key is retrieved at step 1258, and the process proceeds back to step 1238 of FIG. 12b. If not, then process 1006 proceeds to step 1260.

Step 1260 determines whether $k=k_{MAX}$, the maximum k which will be supported by server 220. If not, then 1260 proceeds step 1262 to increment k and returns to step 1234 of FIG. 12b. Further processing for the next supported k is then performed for the bloom filter matrix.

Finally, if step 1260 determines that all possible k's for the current m value have been used for computation of the bloom vector, then process 1006 proceeds to step 1264 on FIG. 12c. It is then determined whether $m=M_{MAX}$, the maximum possible M value. If not, m is incremented by the step size $STEP_m$ at step 1266, and process 1006 proceeds back to step 1232 for computation of the bloom vector for all possible values of k for this value of m. Once it is determined that $m=M_{MAX}$ at step 1264, then computation of the bloom filter matrix is complete, and it can be made available to any clients which may connect with the server. Once the calculation of the matrix is complete, accessing of a bloom filter suing 400, is performed by accessing the values stored for client-specified and/or default M and k values (or $\alpha$, if specified) and transmitted in a single string to a requesting client.

Thus, a method and apparatus of determining membership in a database, such as an invalidity database 222, has been described. This may be done, in some embodiments, without referencing that external database using a local invalidity cache implemented as a parameterized bloom filter stored in a client system. Such a system ensures that if a client determines, by use of the bloom filter, that the key is not a member of the database, it is guaranteed that the key is not a member of the database. Thus, no communication with a server and corresponding search need be performed. This thus conserves communication resources between servers and clients, and further guarantees that the key is not invalid. Although this invention has been described specifically with references to certain specific embodiments contained in FIGS. 2–12c, it can be appreciated by one skilled in the art that many modifications may be made without departing from the overall spirit and scope of this invention. Thus, the invention is to be construed by the claims which follow.

What is claimed is:

1. A method in a first computer system of determining validity of a key comprising:
   a. updating a bloom filter at periodic intervals by:
      i. providing said first computer system's requirements of said bloom filter to a second computer system, said second computer system having access to an invalidity database which includes all invalid keys; and
      ii. receiving bloom vectors and coefficients which comprise said bloom filter from said second computer system;
   b. accepting said key; and
   c. applying said bloom filter to said key to determine if said key is present in said invalidity database.

2. The method of claim 1 further comprising the step of confirming invalidity of said key if said bloom filter indicates that said key is present in said invalidity database by transmitting said key to said second computer system to determine the presence of said key in said invalidity database and receiving a result signal from said second computer system indicating whether said key is present in said invalidity database.

3. The method of claim 1 wherein said step of updating said bloom filter further includes the step of receiving a prime key associated with said bloom vectors and said coefficients.

4. The method of claim 1 wherein said step of applying said bloom filter includes hashing said key with said coefficients and said prime key to generate a test value and comparing said test value with said bloom vectors.

5. The method of claim 1 wherein said step of providing said first computer system's requirements includes providing a number of bits which are included in said bloom vectors.

6. The method of claim 1 wherein said step of providing said first computer system's requirements includes providing a number of said coefficients.

7. The method of claim 1 wherein said step of providing said first computer system's requirements includes providing an error value indicating the possibility of error of said bloom filter.

8. An apparatus in a first computer system for determining validity of a key comprising:
   a. a first circuit for updating a bloom filter at periodic intervals by:
      i. providing said first computer system's requirements of said bloom filter to a second computer system, said second computer system having access to an invalidity database which includes all invalid keys; and
      ii. receiving bloom vectors and coefficients which comprise said bloom filter from said second computer system;
   b. a second circuit for accepting said key; and
   c. a third circuit for applying said bloom filter to said key to determine if said key is present in said invalidity database.

9. The apparatus of claim 8 further comprising a fourth circuit for confirming invalidity of said key if said bloom filter indicates that said key is present in said invalidity database by transmitting said key to said second computer system to determine the presence of said key in said invalidity database and receiving a result signal from said second computer system indicating whether said key is present in said invalidity database.

10. The apparatus of claim 8 wherein said updating said bloom filter further includes the step of receiving a prime key associated with said bloom vectors and said coefficients.

11. The apparatus of claim 8 wherein said applying of said bloom filter includes hashing said key with said coefficients and said prime key to generate a test value and comparing said test value with said bloom vectors.

12. The apparatus of claim 8 wherein said providing of said first computer system's requirements includes providing a number of bits which are included in said bloom vectors.

13. The apparatus of claim 8 wherein said providing of said first computer system's requirements includes providing a number of said coefficients.

14. The apparatus of claim 8 wherein said providing of said first computer system's requirements includes providing an error value indicating the possibility of error of said bloom filter.

15. A method in a client of determining database membership of a key stored in a server comprising the following steps:
   a. accepting said key;
   b. determining whether a bloom filter stored in said client is current, and if not, performing the following steps:
      i. providing parameters of said bloom filter to said server according to requirements of said client and requesting said bloom filter from said server;
      ii. receiving a bloom vector which comprises said bloom filter; and
      iii. receiving coefficients which comprise said bloom filter;
   c. determining whether said bloom filter of said key matches said bloom vector;
   d. if said bloom filter of said key does not match said bloom vector then indicating that said key is not a member of said database.

16. The method of claim 15 wherein said parameters include a number of bits in said bloom vector.

17. The method of claim 15 wherein said parameters include a number of coefficients which comprise said bloom filter.

18. The method of claim 15 wherein said parameters include a value indicating the likelihood that said bloom filter will falsely indicate that said key is a member of said database.

19. The method of claim 15 wherein said step of determining whether said bloom filter of said key matches said bloom vector includes hashing said coefficients comprising said bloom filter with said key, and determining whether a result of said hash equals said bloom vector.

20. The method of claim 15 further comprising the step of requesting that said server perform a lookup in said database to determine if said key is a member in the event that said bloom filter of said key matches said bloom vector.

21. The method of claim 15 where said step of providing parameters of said bloom filter to said server includes receiving from said server a range of parameters which said server can provide, and responsive thereto, said client providing certain of said parameters to said server.

22. A validity detection system comprising:
   a. a key input circuit for accepting a key;
   b. a bloom filter coupled to said key input circuit for determining validity of said key, said bloom filter generating a valid signal if said key is not present in an invalidity database, said bloom filter generating an invalid signal if said key may be present in said invalidity database;
   c. a key invalidity confirmation circuit coupled to said bloom filter for confirming invalidity of said key if said bloom filter generates said invalid signal, said key invalidity confirmation circuit including:
      i. a key transmission circuit for transmitting said key to a server having said invalidity database;
      ii. a reception circuit for receiving a result signal indicating whether said key is present in said invalidity database;
   d. a bloom filter update circuit coupled to said bloom filter which is operative at periodic intervals for updating said bloom filter, said bloom filter update circuit including:
      i. a parameter provision circuit for providing client requirements of said bloom filter to said server;
      ii. a bloom vector reception circuit for receiving bloom vectors which comprise said bloom filter;
      iii. a coefficient reception circuit for receiving coefficients which comprise said bloom filter; and
      iv. a bloom filter request circuit for requesting said bloom vectors and said coefficients from said server according to said client requirements.

23. The apparatus of claim 22 wherein said server includes:
   a. said invalidity database which includes all invalid keys for said invalidity detection system;
   b. a bloom vector calculation circuit for calculating said bloom vectors and said coefficients according to different values of said parameters;
   c. a bloom filter matrix for storing said bloom vectors and said coefficients arranged in said matrix by said parameters; and
   d. a bloom filter provision circuit for accessing said coefficients and said bloom vectors in said bloom filter matrix by client-specified parameters, and responsive thereto, providing said coefficients and said bloom vectors to said client.

24. The apparatus of claim 22 further comprising:
   a. a current filter detection circuit for determining whether said bloom filter is current; and
   b. an activation circuit for activating said bloom filter request circuit responsive to said current filter detection circuit for determining that said bloom filter is not current.

25. The apparatus of claim 22 wherein said bloom filter includes:
   a. a hash computation circuit for hashing said key with said coefficients in order to determine a test value; and
   b. a bloom vector determination circuit coupled to said hash computation circuit for comparing said test value against said bloom vectors; and
   c. an invalid signal generation circuit coupled to said bloom vector determination circuit for activation of said invalid signal if said test value equals a first bloom vector of said bloom vectors.

26. The apparatus of claim 25 wherein said hash computation circuit includes:
   a. a product circuit for multiplying said key and a first coefficient of said coefficients to produce a product; and
   b. a modulo circuit coupled to said product circuit for performing a modulo of said product and a key coefficient in order to produce said test value.

* * * * *

UNITED STATES PATENT AND TRADEMARK OFFICE
CERTIFICATE OF CORRECTION

| | | |
|---|---|---|
| PATENT NO. | : | 5,701,464 |
| DATED | : | December 23, 1997 |
| INVENTOR(S) | : | David W. Aucsmith |

It is certified that error appears in the above-identified patent and that said Letters Patent is hereby corrected as shown below:

In column 6 at line 58 delete "suing" and insert --string --

In column 6 at line 60 delete "suing" and insert --string --

Signed and Sealed this

Sixth Day of October, 1998

*Attest:*

BRUCE LEHMAN

*Attesting Officer*  *Commissioner of Patents and Trademarks*